(12) United States Patent
Johnson et al.

(10) Patent No.: US 7,547,418 B2
(45) Date of Patent: Jun. 16, 2009

(54) FLUIDIZED-BED REACTOR SYSTEM

(75) Inventors: John T. Johnson, Sterling Heights, MI (US); Daniel Dziedzic, Rochester Hills, MI (US); Kenneth B. Gross, Troy, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 728 days.

(21) Appl. No.: 10/763,951

(22) Filed: Jan. 23, 2004

(65) Prior Publication Data

US 2005/0163673 A1 Jul. 28, 2005

(51) Int. Cl.
  *B01J 8/18* (2006.01)
  *F27B 15/00* (2006.01)
  *F27B 15/08* (2006.01)
  *B01D 53/34* (2006.01)
  *F01N 3/00* (2006.01)
  *F23J 11/00* (2006.01)

(52) U.S. Cl. .................. 422/139; 422/143; 422/147; 422/168

(58) Field of Classification Search .......... 422/139, 422/147, 168, 186.3, 143; 204/157.3, 158.2
See application file for complete search history.

(56) References Cited

U.S. PATENT DOCUMENTS

| | | | |
|---|---|---|---|
| RE24,954 E | 3/1961 | Church | |
| 3,375,058 A | 3/1968 | Petersen et al. | 423/2 |
| 3,606,737 A | 9/1971 | Lefevre | 55/319 |
| 3,615,256 A * | 10/1971 | Miller et al. | 422/146 |
| 3,951,627 A | 4/1976 | Barr, Jr. et al. | 55/284 |
| 3,997,447 A * | 12/1976 | Breton et al. | 210/360.2 |
| 4,343,631 A | 8/1982 | Ciliberti | 55/302 |
| 4,395,269 A | 7/1983 | Schuler | 55/302 |
| 4,419,113 A | 12/1983 | Smith | 55/484 |
| 4,468,240 A | 8/1984 | Margraf | 55/290 |
| 4,585,673 A * | 4/1986 | Sigai | 427/213 |
| 4,830,841 A | 5/1989 | Urza | 423/261 |
| 4,865,627 A | 9/1989 | Dewitz et al. | 55/20 |
| 4,994,498 A * | 2/1991 | Kinkade | 518/714 |
| 5,013,341 A | 5/1991 | Isaksson et al. | 55/302 |

(Continued)

FOREIGN PATENT DOCUMENTS

| EP | 1046893 A2 | 4/2000 |
|---|---|---|
| JP | 2003334424 A * | 11/2003 |

OTHER PUBLICATIONS

JPO Machine Translation of JP 2003334424 A (Aug. 6, 2008).*

(Continued)

*Primary Examiner*—Alexa D Neckel
*Assistant Examiner*—Matthew J Merkling

(57) ABSTRACT

A fluidized-bed reactor comprising a chamber defining a hollow interior region and having a lower surface; a first input for introducing a contaminated gas into the hollow interior region; a plurality of catalyst nanoparticles within the hollow interior region and located on the lower surface, and a fluidizing input for introducing a fluidizing material into the hollow interior region, said fluidizing input having an outlet directed at the lower surface of the chamber, wherein the introduction of the fluidizing material directed at the lower surface fluidizes at least a portion of the catalyst nanoparticles located on the lower surface to create a gaseous dispersion of catalyst nanoparticles that reacts with the contaminated gas to produce a decontaminated gas.

29 Claims, 5 Drawing Sheets

U.S. PATENT DOCUMENTS

| | | | | |
|---|---|---|---|---|
| 5,045,288 | A | 9/1991 | Raupp et al. | 422/186.3 |
| 5,114,692 | A | 5/1992 | Berty | 423/245.3 |
| 5,167,676 | A | 12/1992 | Nakaishi et al. | 55/96 |
| 5,254,144 | A | 10/1993 | Provol | 95/280 |
| 5,453,108 | A | 9/1995 | Isaksson et al. | 55/302 |
| 5,458,665 | A | 10/1995 | Martin et al. | 55/302 |
| 5,462,674 | A | 10/1995 | Butters et al. | 210/748 |
| 5,514,278 | A | 5/1996 | Khudenko | 210/605 |
| 5,554,300 | A | 9/1996 | Butters et al. | 210/748 |
| 5,752,999 | A | 5/1998 | Newby et al. | 55/350.1 |
| 5,876,537 | A | 3/1999 | Hill et al. | 156/89.11 |
| 5,933,702 | A * | 8/1999 | Goswami | 422/186.3 |
| 5,936,135 | A * | 8/1999 | Choudhary et al. | 585/418 |
| 5,944,859 | A | 8/1999 | Lippert et al. | 55/302 |
| 5,993,624 | A * | 11/1999 | Matsubara et al. | 204/424 |
| 6,056,796 | A | 5/2000 | Chiang et al. | 55/302 |
| 6,123,746 | A | 9/2000 | Alvin et al. | 55/502 |
| 6,136,203 | A | 10/2000 | Butters et al. | 210/743 |
| 6,156,114 | A | 12/2000 | Bell et al. | 106/400 |
| 6,273,925 | B1 | 8/2001 | Alvin et al. | 55/282.2 |
| 6,290,743 | B1 | 9/2001 | Alvin et al. | 55/482 |
| 6,312,490 | B1 | 11/2001 | Lippert et al. | 55/482 |
| 6,361,575 | B1 | 3/2002 | Alvin et al. | 55/378 |
| 6,383,301 | B1 | 5/2002 | Bell et al. | 118/716 |
| 6,398,837 | B1 | 6/2002 | Alvin et al. | 55/486 |
| 6,451,081 | B1 | 9/2002 | Alvin | 55/523 |
| 6,500,969 | B1 * | 12/2002 | Zhou et al. | 549/531 |
| 6,592,641 | B2 | 7/2003 | Alvin et al. | 55/341.3 |
| 6,653,356 | B2 * | 11/2003 | Sherman | 516/90 |
| 6,782,892 | B2 * | 8/2004 | Li et al. | 131/364 |
| 6,812,470 | B2 * | 11/2004 | Sato | 250/455.11 |
| 6,887,291 | B2 * | 5/2005 | Alford et al. | 55/302 |
| 2002/0006368 | A1 * | 1/2002 | Becker et al. | 422/211 |
| 2002/0187082 | A1 * | 12/2002 | Wu et al. | 422/139 |
| 2005/0129591 | A1 * | 6/2005 | Wei et al. | 422/186 |
| 2006/0078771 | A1 * | 4/2006 | Ballantine et al. | 429/22 |

OTHER PUBLICATIONS

"Titania-Supported Bimetallic Catalyst Synthesis by Photocatalytis Codeposition at Ambient Temperature: Preparation and Characterization of PT-Rh, Ag-Rh, and PT-Pd Couples", Journal Of Catalysis 132, pp. 490-497 (1991).

"Simple Photocatalysis Model for Photoefficiency Enhancement via Controlled, Periodic Illumination;" J. Phys. Chem. B 1997, 101, 2625-2631.

"Photocatalytic Oxidation of Propene over Various Oxides at 320 K. Selectivity;" The Journal of Physical Chemistry, vol. 83, No. 24, pp. 3122-3126 (1979).

"Charge Carrier Dynamics at $TiO_2$ Particles: Reactivity of Free and Trapped Holes;" J. Phys. Chem B 1997, 101, 4265-4275.

"Fluidized-Bed Photocatalytic Oxidation of Trichloroethylene in Contaminated Airstreams;" Environ. Sci. Technol. 1992, 26, 492-495.

"Photocatalytic purification and remediation of contaminated air and water;" C.R. Acad. Sci. Paris, Serie 1lc,Chimie/Chemistry 3 (2000) 405-411.

"Application of Titanium Dioxide Photocatalysis to Create Self-Cleaning Building Materials;" Lacer No. 5, 2000 pp. 157-168.

"Environmental Applications of Semiconductor Photocatalysis;" Chem. Rev. 1995, 95, 69-66.

"$Pt/TiO_2$ Catalysts: Characterization and Use in Photocatalytic Reactions;" Ecole Centrale de Lyon, B.P. 163, 69131, ECULLY, Cedex, France, pp. 741-749.

"Effect of Silver on the Photocatalytic Activity of TiO2;" Journal of Solid State Chemistry 106, 288-294 (1993).

"Vibrofluidized—and fixed-bed photocatalytic reactors: case of gaseous acetone photooxidation;" Chemical Engineering Science 55 (2000) 5089-5098.

"Energy and Environment Will be the Dominant Concerns of Our Day;" Proceedings, vol. 2, 6$^{th}$ International Symposium on Solar Thermal Concentrating Technologies, Sep. 28-Oct. 2, 1992, pp. 1223-1231.

* cited by examiner

FLUIDIZED-BED REACTOR SYSTEM

BACKGROUND

The present disclosure relates to a fluidized-bed reactor, and more particularly, to a fluidized-bed reactor having a fluidized nanoparticle cloud that breaks down volatile organic compounds.

Systems to remove pollutants from air to improve air quality are known. In a typical manufacturing process one or more organic compounds, such as hydrocarbon pollutants, may be produced which may necessitate removal and/or degradation. However, many prior art systems have significant energy and maintenance requirements.

Systems using catalytic oxidation such as photocatalytic oxidation systems (PCO) using titanium dioxide ($TiO_2$) catalysts provide a viable alternative for the remediation of air contamination by organic compounds without the high energy and excessive maintenance demands of other waste removal systems. PCO systems use $TiO_2$, a metal oxide semiconductor, and ultraviolet photons. The ultraviolet photons excite electrons at the surface of $TiO_2$ and move the electrons from the valence band to the conductance band, thus forming a $TiO_2$ photocatalyst particle having an electron-hole pair. The hole is a strong oxidizing agent that may oxidize water to the hydroxyl radical and subsequently attack many hydrocarbon molecules. In this manner, volatile hydrocarbons may be removed from the gas phase, adsorbed on the $TiO_2$ catalyst surface, and eventually oxidized into water ($H_2O$) and carbon dioxide ($CO_2$).

Catalytic and photocatalytic oxidation systems provide other important advantages for the removal of pollutants and improvement of air quality over thermal oxidation and catalytic incineration systems. Photocatalytic oxidation (PCO) reactors can operate as a modular, self-cleaning device, capable of integration into existing systems such as heating, ventilation and/or air conditioning systems. One such PCO reactor comprises an annular reactor, whereby a photocatalyst is coated on the inner walls of the reactor that encases an ultraviolet (UV) light source. UV illumination of a catalyst such as titanium dioxide applied to a surface generates an effective catalyst for the oxidation of organic compounds such as hydrocarbons, alcohols, halocarbons and amines.

As the catalyst oxidizes the volatile hydrocarbons, intermediate substances may form which may adhere to the catalyst, slowing down and eventually inhibiting the reactant property of the catalyst coating, thereby reducing the overall effectiveness of the reactor system. Consequently, PCO reactors have been improved through fluidized-bed technology.

A fluidized-bed reactor is a reactor in which a solid reactant and/or catalyst has been given the properties of a quasi-fluid. Fluidization can be achieved by the entraining of fine particles in a carrying gas or by imparting kinetic energy through vibration. Fluidized bed reactor systems are advantageous because the photocatalyst nanoparticles are continuously moving. This increases the surface exposure to contaminants and, in a PCO system, to irradiation by UV light. Typically, a fluidized-bed consists of a vertically oriented chamber filled with powdered material through which a flow of gaseous material is pumped upward from the bottom of the bed. When a drag force of the gaseous airflow exceeds gravity, the particles are lifted and fluidization occurs. The probability of photocatalyst nanoparticles being UV irradiated increases in a photoreactor where the particles are continuously moving as compared with a reactor where the photocatalyst nanoparticles are stationary. Improvements in efficiency and effectiveness correspond to improvements in continuous particle movement. However, improvements in continuous particle movement should be balanced against the desire for high throughputs and the need to contain the catalyst nanoparticles within the system.

Although catalytic oxidation such as PCO using $TiO_2$ breaks down gaseous hydrocarbons, aerosols, and hydrocarbons adsorbed on solids, a predictable slow down in reaction rate may occur over time. A system that increases the contact between the ultraviolet photons, photocatalyst nanoparticles and hydrocarbons while containing the particles within the system may enhance the PCO reaction. Finally, the reactors that enhance PCO reactions may also provide high throughputs and outputs with minimized loss of particles.

BRIEF SUMMARY

Disclosed herein is a fluidized-bed reactor including a chamber defining a hollow interior region and having a lower surface; a first input for introducing a contaminated gas into the hollow interior region; a plurality of catalyst nanoparticles within the hollow interior region and located on the lower surface, and a fluidizing input for introducing a fluidizing material into the hollow interior region. The fluidizing input has an outlet directed at the lower surface of the chamber, wherein the introduction of the fluidizing material directed at the lower surface fluidizes at least a portion of the catalyst nanoparticles located on the lower surface to create a gaseous dispersion of catalyst nanoparticles that reacts with the contaminated gas to produce a decontaminated gas.

Also disclosed is a method of removing contaminants from a contaminated gas. The method includes providing a fluidized-bed reactor as disclosed herein, and introducing a fluidizing material into the chamber of the reactor and directing the fluidizing material at the lower surface to fluidize at least a portion of the catalyst nanoparticles located on the lower surface to create a gaseous dispersion of catalyst nanoparticles that react with the contaminated gas to produce a decontaminated gas.

The above described and other features are exemplified by the following figures and detailed description.

BRIEF DESCRIPTION OF THE DRAWINGS

Referring now to the figures, which are meant to be exemplary embodiments, and wherein the like elements are numbered alike.

DETAILED DESCRIPTION OF THE PREFERRED EMBODIMENT

The present disclosure provides a continuous flow, fluidized bed reactor that has the capacity to generate and maintain a dispersion of a catalyst particle cloud within the reactor for the effective break down of gaseous contaminants such as hydrocarbons and provide desirable throughputs and outputs. As used herein, the term "throughput" is given the ordinary meaning known to those skilled in the art and refers to the quantity of material passing through a system or a portion of a system in a given time or at a given rate. The term "output" is given the ordinary meaning known to those skilled in the art and refers to the product of a system. The term "high throughput" used herein refers to the quantity of material passing through a system or a portion of a system in a given time or at a given rate as determined to be advantageous or in excess of a quantity generally understood by those skilled in the art.

Figure 1:
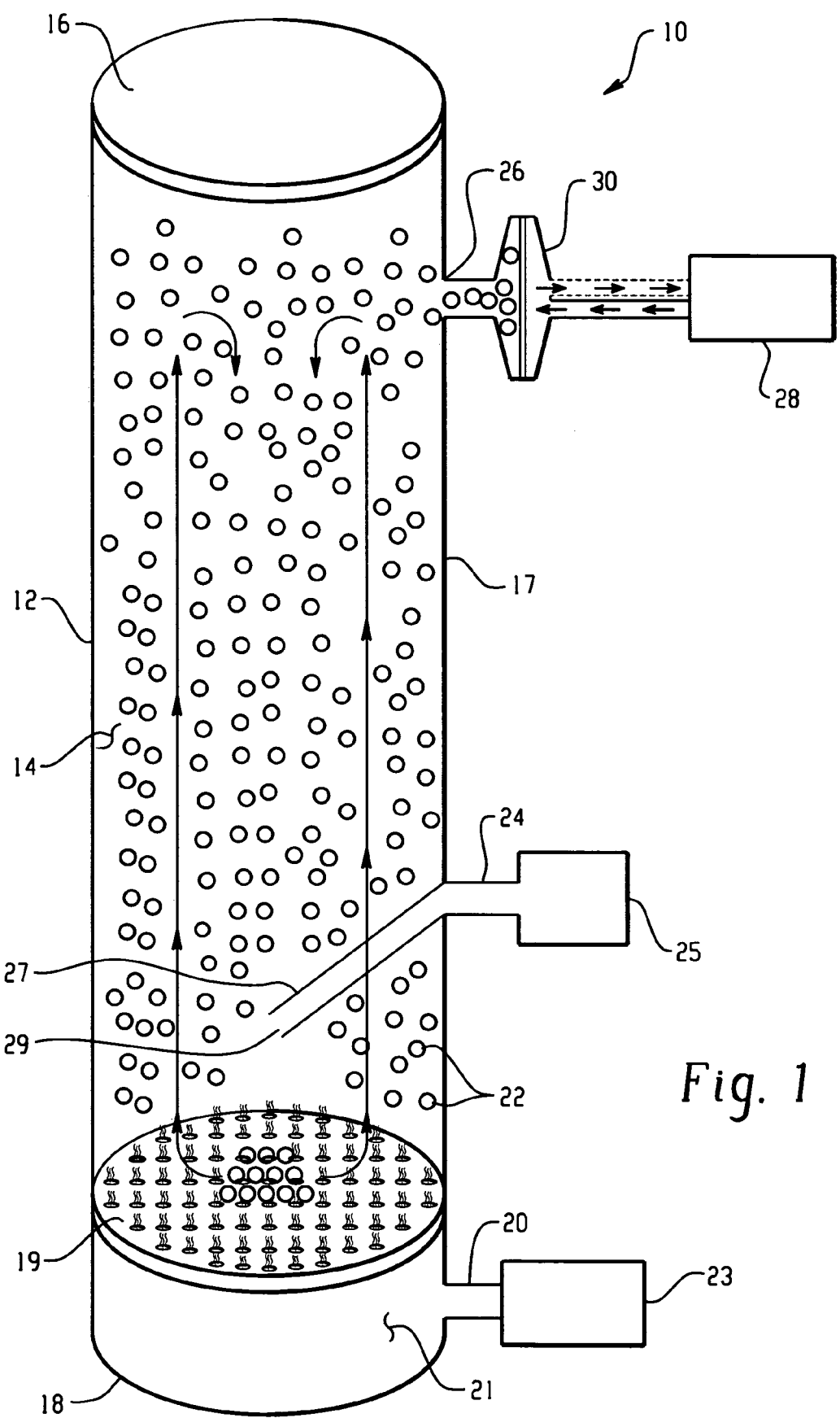
FIG. 1 is a general perspective view of a fluidized-bed reactor.

Referring to FIG. 1, there is a fluidized-bed reactor generally referred to as reference numeral 10. The reactor 10 generally includes a chamber 12 defining a hollow interior region 14. The chamber 12 may be any of a variety of shapes being dimensionally adapted to operate within a desired reactor. For example, the chamber 12 may comprise of one or more columns coupled together by material to provide a chamber 12 having the dimensions and flexibility suitable for the desired application. In one exemplary embodiment, the chamber 12 will be a cylindrical column. The term "chamber" herein is given the ordinary meaning and includes a case or enclosure. The material composition of the chamber 12 will be determined by the desired application and may be chosen from suitable polycarbonate compositions, stainless steel, glass and/or materials known to those skilled in the art. In one exemplary embodiment, the chamber 12 will be comprised of polycarbonate plastic.

The chamber 12 may comprise an upper and a lower surface 16,18 and at least one sidewall 17. The upper and lower surfaces 16,18 may be contiguous with the chamber 12. In another embodiment, the upper and lower surface 16 and 18 comprise a device effective to provide a chamber 12 that defines the hollow interior region 14. Illustrative examples of upper and lower surfaces 16 and 18 are a cap, a sealant and the like. In one embodiment, the upper surface 16 comprises a screw-type cap comprised of a metallic material such as aluminum. The selection of the upper and lower surface 16,18 will be determined by the desired application. In another embodiment, a gas permeable layer 19 such as a course grade Pyrex® glass frit is located within the hollow interior region 14 forming a hollow space 21 between the permeable layer 19 and the lower surface 18 of the chamber 12. In this embodiment, the device 10 allows transmission of a gas and/or gaseous material into the hollow space 21 through a first input 20. The gaseous material is supplied from gaseous material source 23 via first input 20 through gas permeable layer 19 and into the hollow interior region 14. In one exemplary embodiment, the gaseous material introduced by first input 20 will be a contaminated gas. As used herein the term "gaseous material", also referred to as "gas", refers to compositions in a gaseous state, as well suspensions of materials, such as aerosols comprising liquid droplets. In one exemplary embodiment, gaseous material source 23 will thus be a source of a contaminated gas such as a gas containing hydrocarbon contaminants.

As used herein, the term "contaminated" refers to the presence of unwanted material. Illustrative unwanted materials or contaminants for which removal or degradation is desirable include the class of hydrocarbon compositions, for example, methane, styrene, xylene, butanol and the like. Generally, such contaminants are in a gaseous state. In one embodiment, the contaminated gas will consist of contaminants in gaseous form such as one or more hydrocarbon gases. In another embodiment, the contaminants may also be present in the form of aerosols. Aerosol as used herein refers to liquid(s) present in the form of droplets. In one embodiment, illustrative aerosols will have an average diameter of about 0.01 micrometers to about 50 micrometers. Aerosols may be present when a contaminated gas is subjected to conditions such as temperature and pressure changes that cause gaseous contaminants to condense.

The first input 20 may comprise any of a variety of devices capable of introducing a contaminated gas into the hollow interior region 14, as will be discussed later herein. In one exemplary embodiment, a contaminated gas is introduced into the hollow interior region 14 with adequate force and velocity to fluidize the catalyst nanoparticles 22 to produce a decontaminated gas that reaches the upper surface 16 of the chamber 12. The term "decontaminated" as used herein refers to a concentration of one or more contaminants that is less than that present in the gaseous material or contaminated gas when the contaminated gas is introduced into the hollow interior region 14, and includes the reaction products of any reactions between the contaminated gas and the fluidized catalyst nanoparticles 22.

Typically, suitable force and velocity vectors are determined by various factors including but not limited to, volume of the hollow interior region 14, density and/or concentration of the contaminated gas, type of contaminant and/or particles 22 and the like. For example, in one exemplary embodiment, the contaminated gas may be introduced via first input 20 at a flow rate of about 4 liters per minute into a hollow interior region 14 having a dimension of about 22 inches in length and 2 inches in diameter to achieve a desirable high throughput.

The reactor 10 further comprises a plurality of catalyst nanoparticles 22 within the hollow interior region 14 of the chamber 12. The plurality of catalyst nanoparticles 22 within the hollow interior region 14 is disposed in a manner that allows the catalyst nanoparticles 22 to become dispersed within the chamber 12. In one preferred embodiment, the catalyst nanoparticles 22 are placed on the permeable layer 19. The plurality of catalyst nanoparticles 22 may be of a dimension and material composition suitable for the desired reactor.

The term "nanoparticle" as used herein refers to particles having dimensions from about a few nanometers (nm) to up to about 100 nanometers in diameter. In one exemplary embodiment, nanoparticles will have an average particle diameter of about 15 nm to about 25 nm. Nanoparticles provide a large surface area relative to the small diameter of the catalyst nanoparticles allowing for a desirable available surface area for reactions such as catalysis.

The composition of the catalyst nanoparticles may be any of a variety of catalyst materials known to those skilled in the art including but not limited to, catalytic and photocatalytic material such as metal oxides, semi-conductive material, noble metal and mixtures thereof comprising catalyst and/or co-catalyst particle compositions. As used herein the term "catalyst" refers to a substance that alters the rate of a reaction and may be recovered essentially unaltered in form and amount at the completion of the reaction. The term "co-catalyst" refers to a material, which may be a catalyst itself, which functions with a catalyst in a reaction.

Suitable catalyst nanoparticles 22 may also comprise one or more metals such as, but not limited to, noble metal catalyst and/or co-catalyst, such as copper (Cu), ruthenium (Ru), osmium, (Os), platinum (Pt), silver (Ag), nickel (Ni), rhodium (Rh), palladium (Pd), gold (Au), and/or combinations thereof, such as Pt/Rh, Ag/Rh, Pt/Pd co-catalyst mixtures for catalytic and/or photocatalytic reactions.

In one exemplary embodiment, a metal oxide such as titanium dioxide, $TiO_2$, is used in catalyst nanoparticles 22 when an ultraviolet light source is employed. Other material suitable for use in catalyst nanoparticles 22 include semi-conductive materials such as aluminum oxide $Al_2O_3$, vanadium pentoxide $V_2O_5$, iron (III) oxide $Fe_2O_3$, zinc oxide ZnO, cadmium sulfide CdS, zinc Zn, zinc telluride ZnTe, zirconium oxide $ZrO_2$, molybdenum disulfide $MoS_2$, tin (IV) oxide $SnO_2$, antimony tetraoxide $Sb_2O_4$, cerium (IV) dioxide $CeO_2$, tungsten trioxide $WO_3$, niobium pentoxide $Nb_2O_5$, materials known in the art to generate a catalytic material within a fluidized-bed reactor for the breakdown of hydrocarbon contaminants and mixtures thereof.

The reactor 10 in FIG. 1 further comprises a fluidizing input 24 attached to a source 25 of a fluidizing material. The fluidizing material may comprise a gaseous material. However, in one exemplary embodiment, the fluidizing material will be a gaseous material that does not comprise an aerosol. The exact composition of the fluidizing material will be determined by the desired application. In one exemplary embodiment, the fluidizing material comprises a clean gaseous material composition. Illustrative examples include air, carbon dioxide, nitrogen, argon, oxygen, and mixtures thereof. In one exemplary embodiment, the fluidizing material will be air.

The fluidizing input 24 introduces the fluidizing material into the hollow interior region 14. The fluidizing material enters the hollow interior region 14 with a force and velocity that fluidizes the catalyst nanoparticles 22 within the hollow interior region 14. For example, in one exemplary embodiment, the fluidizing input 24 directs the fluidizing material in a direction such as, but not limited to, about 90° to the surface upon which the catalyst nanoparticles 22 have settled on when not in a fluidized state. For example, this surface upon which the non-fluidized catalyst particle 22 rest maybe the gas permeable layer 19 or the lower surface 18 in the absence of gas permeable layer 19. In another embodiment, the fluidizing material may be introduced at an angle of from about 0 to about less than or equal to 90° relative to the lower surface 18, while in one exemplary embodiment, the fluidizing material will be introduced at an angle of from about 45 to 90° relative to the gas permeable layer 19.

Figure 2:
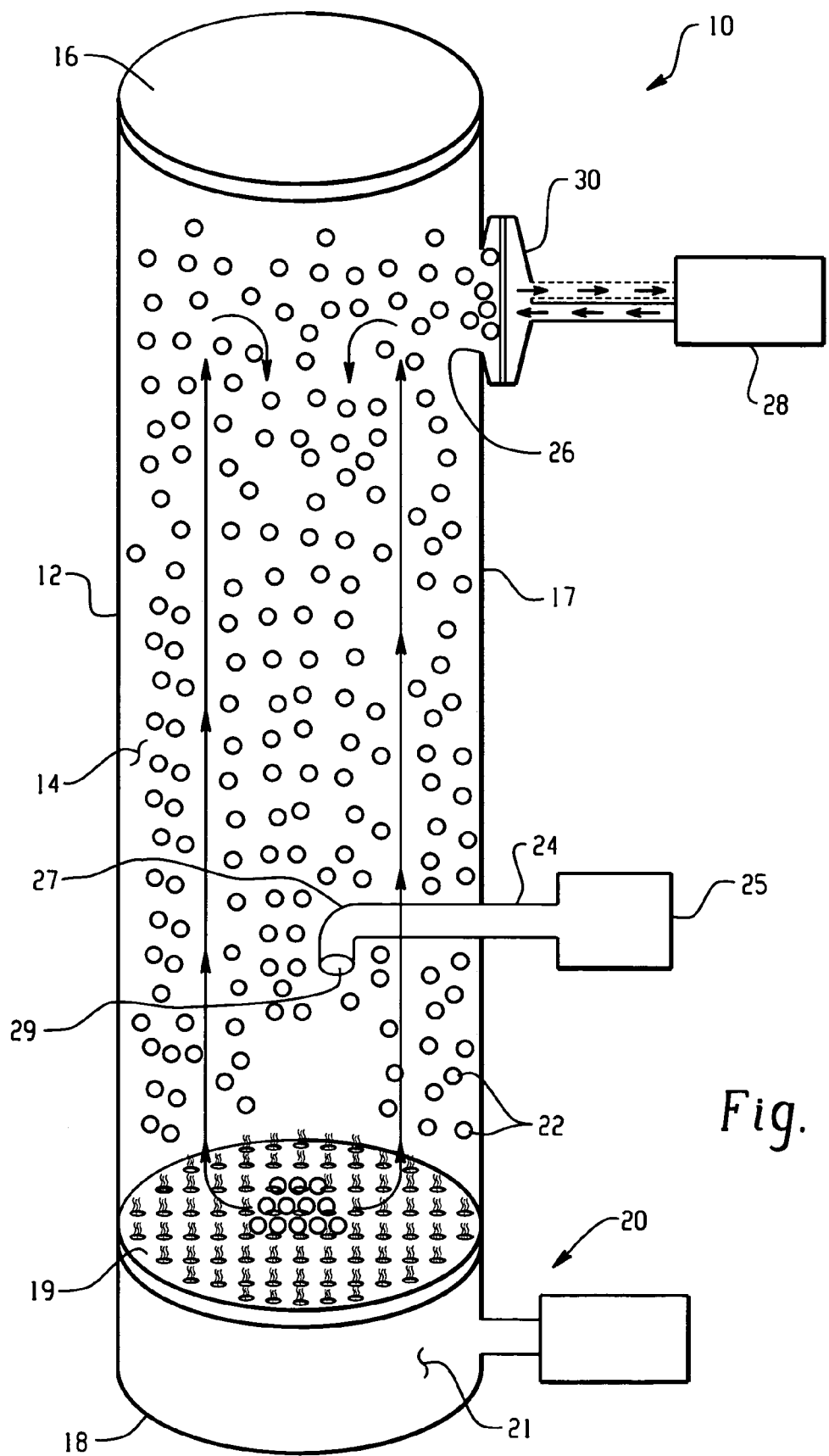
FIG. 2 is a schematic view of an alternate embodiment of a fluidized-bed reactor wherein the separation device is proximate to a sidewall of the chamber.

In one exemplary embodiment, the fluidizing input 24 will be attached to an outlet 27 directed at the gas permeable layer 19. As illustrated in FIGS. 1 and 2, the outlet 27 can be a stainless steel needle that directs the fluidizing material toward the gas permeable layer 19.

In the embodiment shown in FIG. 1, the stainless steel needle outlet 27 is angled at a 45-degree angle relative to the gas permeable layer 19. The outlet needle 27 of FIG. 1 has an opening 29 that faces the gas permeable layer 19. In the embodiment illustrated in FIG. 2, the outlet 27 is a needle that is parallel to the gas permeable layer 19 but which has an opening 29 that directs the fluidizing material toward the lower surface at a 90-degree angle, relative to the gas permeable layer 19.

As the fluidizing input 24 introduces the fluidizing material through the outlet 27, the fluidizing material results in the fluidization of the catalyst nanoparticles 22 so as to produce a gaseous dispersion of catalyst nanoparticles 22. In one exemplary embodiment, the introduction of the contaminated gaseous material aids in the fluidization of the catalyst nanoparticles 22 and the formation of the gaseous dispersion. The gaseous dispersion of catalyst nanoparticles 22 combines with the contaminated gas to result in reactions that produce a decontaminated gas. The introduction of the fluidizing material that fluidizes the particles 22 within the hollow interior region 14 may also act to dilute the concentration of the contaminated gas as selected by the desired application.

It will be appreciated that in one embodiment, the introduction of the gaseous material through first input 20 may also act to assist in the fluidization of the catalyst nanoparticles 22 into a gaseous dispersion.

As the contaminated gas is decontaminated in chamber 12 and reaches the area adjacent to the upper surface 16, the reactor 10 further comprises a port 26 for the exit of the decontaminated gas out of the hollow interior region 14. In order to contain the catalyst nanoparticles 22 within the reactor 10, the reactor 10 further comprises a gas permeable separation device 30 capable of collecting at least agglomerated catalyst nanoparticles 22, and a second input 28 for the introduction of a backpressure pulse of gaseous material into the hollow interior region 14 through the port 26.

As used herein, the term "backpressure pulse" refers to a momentary input of gaseous material having an airflow opposite to that of the exiting decontaminated gas and in a volume and/or pressure sufficient to dislodge any collected or agglomerated nanoparticles 22 on the gas permeable separation device 30. The gas permeable separation device 30 is in communication with both the port 26 and the second input 28. In one embodiment, the gas permeable separation device 30 may be comprised of paper, nylon, glass fiber, polypropylene, cellulose acetate, cellulose nitrate, stainless steel, and the like, as well as combinations of such materials. In one exemplary embodiment, the separation device 30 will comprise cellulose acetate. An example of a commercially available separation device is a polycarbonate membrane of 0.1 microns having a diameter of 47 mm, available from Nuclepore Corp. of Pleasanton, Calif.

In one embodiment, the gas permeable nature of the separation device 30 is such that catalyst nanoparticles 22 may pass through. However, over time, some catalyst nanoparticles 22 may agglomerate and hence collect on the separation device 30. In this manner, the gas permeable separation device 30 collects some of the catalyst nanoparticles 22 from the decontaminated gas as the decontaminated gas passes out of the hollow interior region 14.

The second input 28 introduces a backpressure pulse of gaseous material into the hollow interior region 14 that displaces the catalyst nanoparticles 22 which have agglomerated and collected upon the gas permeable separation device 30. The gaseous material used as the backpressure pulse is as described above with respect to the fluidizing material. The second input 28 introduces the backpressure pulse of gaseous material with force and velocity adequate for displacing the particles 22 collected by the gas permeable separation device 30. Suitable force and velocity vectors will be determined by a variety of factors such as, but not limited to, volume of the hollow interior region, density and/or concentration of the contaminated gas, type of gaseous contaminants and/or catalyst nanoparticles 22 and the like.

In one embodiment, as depicted in FIG. 1, the second input 28 is synchronized to function with the first input 20 and/or fluidizing input 24 in a manner that prevents simultaneous introduction of backpressure pulse of gaseous material by the second input 28, and contaminated gas and/or fluidizing material into the hollow interior region 14. As such, the backpressure pulse of gaseous material and the contaminated gas and/or fluidizing material of the fluidizing input 24 are introduced into the hollow interior region 14 intermittently, and thereby function as a pair of alternatively timed pulses of gas. In this manner, the entrance of incoming contaminated gas and/or fluidizing material thus stops while the backpressure pulse of gaseous material passes into the hollow interior region 14 through the port 26. An alternately timed or synchronized sequence of gases acts to displace any catalyst nanoparticles 22 agglomerated and collected on the gas permeable separation device 30, allowing the catalyst nanoparticles 22 to join the fluidized dispersion of catalyst nanoparticles 22 and to thus continue reacting with the contaminated gas within the hollow interior region 14, while maintaining gas flow throughout the reactor 10 with a high throughput and output.

The second input 28 may be synchronized to function with the first input 20 and/or inlet 24 through a variety of means such as solenoids, activation devices, generators and the like. Additionally, the second input 28 and first input 20 and/or the fluidizing input 24 may be computer programmed to introduce contaminated gas, fluidizing material, and/or backpressure pulse of gaseous material, respectively, in response to reactor conditions, such as internal pressure, heat, contaminant and/or particle build up and the like.

In this manner, during operation, the reactor 10 generates a fluidized, particulate cloud or dispersion comprised of catalyst nanoparticles 22, contaminated gas, decontaminated gas, and fluidizing material that may substantially fill the hollow interior region 14 of the chamber 12. The continual motion of the catalyst nanoparticles 22 within the cloud increases reaction efficiency as the reaction surfaces of the catalyst nanoparticles 22 are repeatedly exposed to the contaminated gas within the hollow interior region 14 of the chamber 12 by the action of the incoming contaminated gas, fluidizing material and backpressure pulse. Also, secondary by-products adhering to the reaction surfaces may be reduced.

Turning to FIG. 2, an alternate embodiment of the reactor 10 having a gas permeable separation device 30 is shown. In this embodiment, the gas permeable separation device 30 capable of collecting agglomerated catalyst nanoparticles 22 is placed at a sidewall 17 of the chamber 12. In this embodiment, the catalyst nanoparticles 22 are collected within the hollow interior region 14 by the gas permeable separation device 30 as the decontaminated gas passes out of the hollow interior region 14. As the backpressure pulse of gaseous material passes through the port 26 and the gas permeable separation device 30, the collected catalyst nanoparticles 22 are displaced, and returned to the hollow interior region 14 of the chamber 12.

Figure 3:
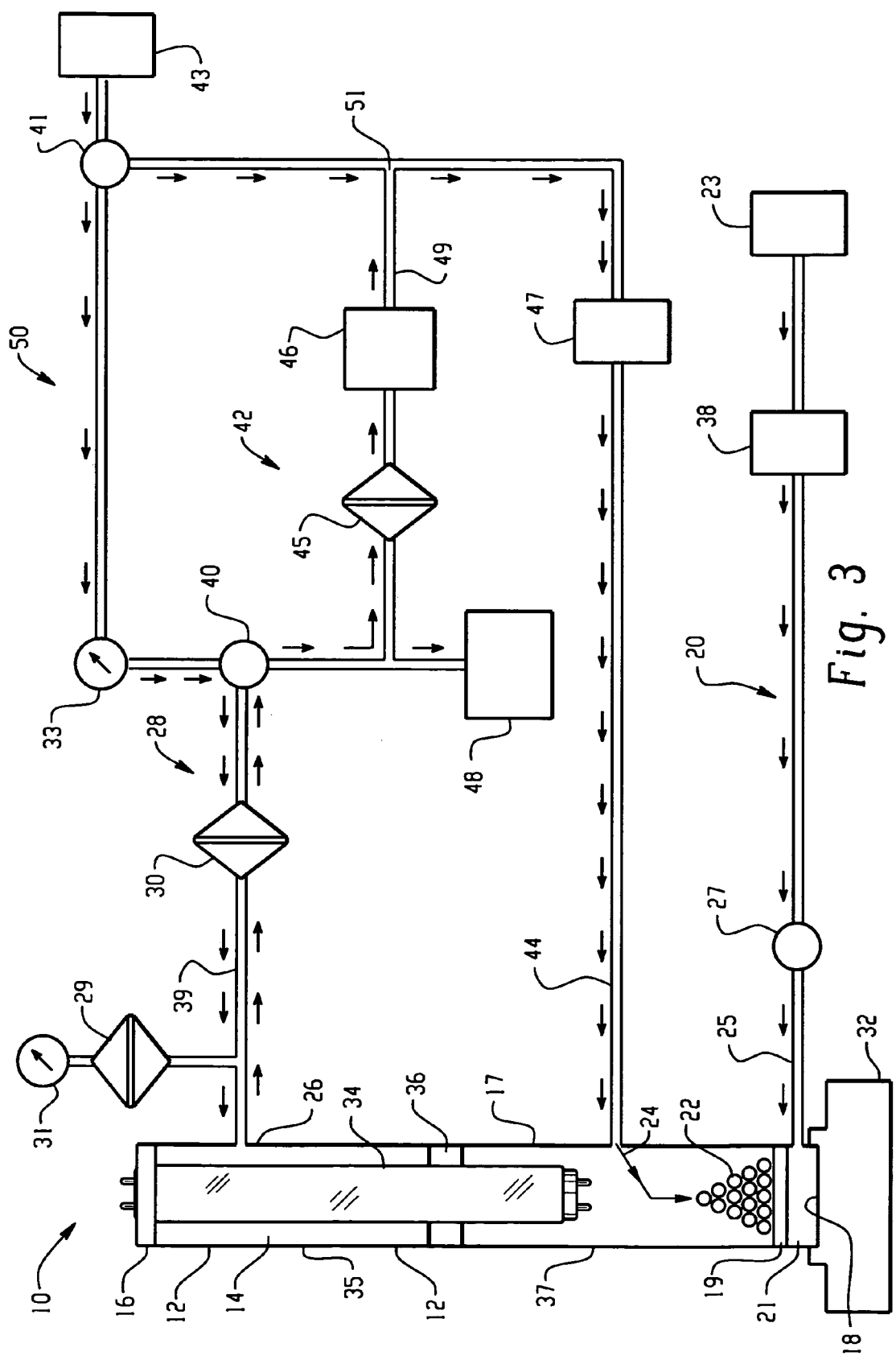
FIG. 3 is a schematic view of a fluidized-bed reactor system.

As illustrated in FIG. 3, a perspective view of a more detailed fluidized-bed reactor generally referred to as reference numeral 50 is shown. The reactor 50 comprises a chamber 12 defining a hollow interior region 14. The chamber may comprise an upper 16 and lower 18 surfaces, and at least one sidewall 17.

As shown, the reactor 50 may optionally comprise an ultraviolet (UV) light 34 for photocatalytic reaction. In this view, an ultraviolet light 34 is positioned within the hollow interior region 14 of the chamber 12. However, it will be appreciated that it is within the scope of the invention for ultraviolet light 34 to be positioned outside the chamber 12 of reactor 50, particularly if chamber 12 is constructed of a material that allow for the transmission of ultraviolet light. Optionally, the chamber 12 may be comprised of one or more columns 37, 35 coupled together with a coupling 36 to provide a chamber 12 of adequate dimension. In other embodiments, more than two columns may be used to provide a chamber 12 of the desired size.

As shown, the reactor 50 is not in operation and a plurality of catalyst nanoparticles 22 is disposed on a gas permeable layer 19 within the hollow interior region 14. The catalyst nanoparticles 22 are as defined above and are capable of suspension and fluidization within the hollow interior region 14.

A first input 20 is shown in communication with a lower surface 18 of the chamber 12 for the introduction of a contaminated gas into the hollow space 21, through the gas permeable layer 19 and into the hollow interior chamber 14. As such, the contaminated gas and catalyst nanoparticles 22 combine and may undergo one or more reactions to produce a decontaminated gas in chamber 12 that reaches upwards towards the upper surface 16 of the chamber 12. The first input 20 comprises a contaminated gas passageway 25 for introducing contaminated gas into the hollow space 21 of the reactor 10. The first input 20 may also comprise a control device 27 to regulate the flow of contaminated gas from a contaminated gas source 23 and into the hollow space 21 of the reactor 10. As such, the contaminated gas may enter the hollow space 21 with a desirable force and velocity to achieve fluidization of the catalyst nanoparticles 22. Additionally, the control device 27 may regulate the flow of contaminated gas into the hollow space 21 to stop and start at predetermined intervals and/or in response to conditions within the reactor 10. As such, the control device 27 provides a flow and/or intermittent pulses of contaminated gas into the hollow space 21, through the permeable layer 19 and into the hollow interior region 14. In this manner, the entrance of contaminated gas may be alternated with the entrance of the backpressure pulse and/or fluidizing material into the hollow interior region 14, as discussed in FIG. 1. An example of a suitable control device 27 is a needle valve.

In another embodiment, the design of the contaminated gas source 23 may provide a flow of contaminated gas having an adequate force and velocity for fluidization of the catalyst nanoparticles 22 and/or provide intermittent pulses of contaminated gas into the hollow space 21.

Optionally, a means 32 for agitating the reactor 10 such as a shaker or vibrator may further fluidize the catalyst nanoparticles 22 within the hollow interior region 14.

In one exemplary embodiment, the contaminated gas will flow through a humidifier 38 before entering the hollow interior region 14. In one exemplary embodiment, the humidifier 38 provides water vapor to the system 50. The water vapor may pass into the system 50 by way of the first input 20. In one exemplary embodiment, the reactor system 50 comprises catalytic oxidation reactions wherein the atmosphere within the hollow interior region 14 may comprise about 5 to about 95 percent (%) humidified material within the hollow interior region 14.

The reactor system 50 further comprises a second input 28 for the introduction of a backpressure pulse of gaseous material into the hollow interior region 14. As shown in this view, the second input comprises a decontaminated gas passageway 39 and at least one control device 40, 41 to regulate the flow of the backpressure pulse of gaseous material into the hollow interior region 14. In one embodiment, the backpressure pulse of gaseous material comprises the decontaminated gas that exits the hollow interior region 14 and recycles back through the separation device 30 and the port 26, and into the hollow interior region 14.

In another embodiment, the backpressure pulse of gaseous material is provided by a gas source 43. The backpressure pulse enters the separation device 30 with a force and velocity sufficient to dislodge catalyst nanoparticles 22 which have been collected by the separation device 30. Additionally, the control devices 40,41 may regulate the flow of backpressure pulse into the hollow interior region 14 to stop and start at predetermined intervals and/or in response to conditions within the reactor 10. As such, the control devices 40,41 provide a flow and/or intermittent pulses of backpressure pulse of gaseous material through the separation device 30 and the port 26 into the hollow interior region 14. In this manner, the entrance of the backpressure pulse may be alternated with the entrance of the contaminated gas and/or fluidizing material into the hollow interior region 14, as discussed in FIG. 1.

The reactor 10 will also comprise a fluidizing inlet 24, as shown in this view, as extending through the sidewall 17, for the introduction of a fluidizing material into the hollow interior region 14 to fluidize the catalyst nanoparticles 22 and optionally control the concentration of contaminated gas within the reactor system 50. Generally, the fluidizing material entering the hollow interior region 14 by way of the inlet 24 is a non-contaminated gaseous material as discussed above. As such, the fluidizing material may dilute the concentration of the contaminated gas within the hollow interior region 14.

In another embodiment, the fluidized material could comprise decontaminated gas that passes from the decontaminated gas material passageway 39, to the inlet gas passageway 44 through flame ionization detector 46, connection 51, and the inlet 24 into the hollow interior region 14. In yet another embodiment, fluidizing material comprises gaseous material flowing from a gas source 43 to the inlet gas passageway 44 and through the inlet 24 into the hollow interior region 14. It will thus be appreciated that in FIG. 3, gaseous source 43 takes the place of gaseous sources 25 and 28 of FIG. 1.

In one embodiment, the control device 41 may regulate the entrance of fluidizing material to stop and start at predetermined intervals and/or in response to conditions within the reactor system 50. As such, the control device 41 provides a flow and/or intermittent pulses of fluidizing material through the inlet 24 and into the hollow interior region 14. In this manner, the entrance of the fluidizing material may be synchronized with the entrance of the contaminated gas and/or backpressure pulse into the hollow interior region 14, as discussed in FIG. 1. In one embodiment, the fluidizing material passes through a measurement device 47 such as a flow meter before passing to the inlet 24 and into the hollow interior region 14.

As shown, the reactor system 50 may comprise one or more control devices 27, 40, 41 to regulate and/or synchronize the introduction of contaminated gas, backpressure pulse and/or fluidizing material into the hollow interior region 14 to stop and start at predetermined intervals and/or in response to conditions within the reactor system 50. In one exemplary example, the control devices 27, 40, 41 regulate the backpressure pulse through the port 26 and into the hollow interior region 14 for about 0.2 second, and the contaminated gas and/or fluidizing material for about 0.8 second, alternating respectively to produce intermittent pulses of material into the hollow interior region 14. The regulation and introduction of the gas flow may be controlled automatically, or in response to various system 50 and/or reactor 10 conditions such as pressure, temperature, quantity of contaminants and the like. Regulation of the gas flow into the hollow interior region 14 may be by control devices 27,40,41 such as solenoids, generators, sensors, control devices, computers, and the like. The conditions within the reactor system 50 such as pressure, temperature, quantity of contaminants and the like may be determined by various monitors within the system.

One such monitor, as shown in FIG. 3, comprises a filtration device 29 to collect catalyst nanoparticles 22 which may have escaped through the port 26 out of the hollow interior region 14, and a readable gauge 31 to relay information. In one embodiment, the information will be relayed to a control device 40, 41 which is programmed to regulate the backpressure pulse in response to the quantity of escaped catalyst nanoparticles 22 through the separation device 30. The readable gauge 31 may also determine factors such as pressure within the system 50. An additional measurement device 33 may provide information of reactor conditions during operation. The system may further comprise additional monitoring apparatus 42 to provide information regarding conditions within the system 50. In this exemplary embodiment, a monitoring apparatus 42 comprises a secondary particle trap 48, filtration device 45 and a flame ionization detector 46. The particle trap 48 and filtration device 45 capture escaped particles 22 before introducing the decontaminated gas to a flame ionization detector 46 for analysis of decontaminated gas prior to emission as exhaust 49. As such, the reactor system 50 may be regulated by information obtained regarding the conditions within the reactor 50.

In one embodiment, the system 50 comprises a catalytic reaction wherein catalyst nanoparticles 22 comprise metal catalyst material such as noble metals. For example, catalyst nanoparticles 22 comprising copper (Cu), ruthenium (Ru), osmium, (os), platinum (Pt), silver (Ag), nickel (Ni), rhodium (Rh), palladium (Pd), gold (Au), and/or combinations thereof, such as Pt/Rh, Ag/Rh, Pt/Pd co-catalyst mixtures may enhance the break-down of hydrocarbons. In one exemplary embodiment, the catalyst nanoparticles 22 will be platinum. In one embodiment, the catalyst nanoparticles 22 comprise nanoparticles. The term "nanoparticle" as used herein refers to particles having dimensions from about a few nanometers (nm) to up to about 100 nanometers in diameter. In one exemplary embodiment, nanoparticles will have an average particle diameter of about 15 nm to about 25 nm. Nanoparticles provide a large surface area relative to the small diameter of the catalyst nanoparticles allowing for a desirable available surface area for reactions such as catalysis. In one especially exemplary embodiment, the catalyst nanoparticles 22 comprise nanoparticles of platinum having an average particle diameter of about 15 nm to about 25 nm.

In this system 50, the catalyst nanoparticles 22 of metal catalyst may be fluidized by the contaminated gas and/or fluidizing material introduced into the hollow interior region 14 by the fluidizing input 24. The fluidizing input 24 directs the gaseous fluidizing material directly onto the catalyst nanoparticles 22. Fluidization may be enhanced by the means for agitating 32 such as a shaker or vibrator.

In one embodiment, the system 50 provides a photocatalytic oxidation (PCO) reaction. In this system 50, a (UV) light 34 is positioned in a manner that allows the (UV) photons to activate the catalyst nanoparticles 22 and may be within or outside the champber 12. In the embodiment illusrated, the (UV) light 34 may be positioned within the chamber 12 to provide irradiation for the photocatalytic process. The catalyst nanoparticles 22 comprise a photocatalytic material such as $TiO_2$ and are fluidized by the contaminated gas and/or the fluidizing material entering through an inlet 24 and forced directly onto the catalyst nanoparticles 22 lying upon a permeable layer 19. The fluidization of catalyst nanoparticles 22 may be enhanced by a means for agitating 32 such as a shaker or vibrator. The contaminated gas passes through a humidifier 38 producing water vapor. In this system, 50 contaminated gas containing hydrocarbon gas and water vapor combines with catalyst nanoparticles 22 of a metal oxide semi-conductive material such as titanium dioxide ($TiO_2$) which provide the reaction surface to break down hydrocarbons in the contaminated gas. A UV light 34 in the system 50 excites electrons on the surface of the $TiO_2$, moving the electrons from the valence band to the conductance band thereby forming an electron-hole pair. The hole provides an oxidizing agent that can oxidize water vapor in the system 50 to a hydroxyl radical and continue to react with a variety of hydrocarbon molecules. Unwanted material such as volatile hydrocarbons adsorb onto the surface of the catalyst nanoparticles 22 and oxidize to produce a decontaminated gas which may comprise reaction products such as carbon dioxide, water and exhaust gas material. In other embodiments, the decontaminated gas may comprise reduced concentrations of the gaseous contaminants as well as reaction products.

In another embodiment, the system 50 provides for a (PCO) reaction wherein catalyst nanoparticles 22 comprise catalyst and co-catalyst material that are fluidized to facilitate the break down of gaseous hydrocarbon contaminants. In this embodiment, a catalyst such as a metal oxide may be combined with a metal co-catalyst to provide the breakdown of hydrocarbons. For example, $TiO_2$, a metal oxide may be combined with a noble metal catalyst, such as copper (Cu), ruthenium (Ru), osmium, (Os), platinum (Pt), silver (Ag), nickel (Ni), rhodium (Rh), palladium (Pd), gold (Au), and/or combinations thereof, such as Pt/Rh, Ag/Rh, Pt/Pd co-catalyst mixtures for catalytic and/or photocatalytic reactions.

A method for removing contaminants from a contaminated gas comprises providing a fluidized-bed reactor system 50 comprising a chamber 12 defining a hollow interior region 14, a first input 20 for introducing a contaminated gas into the hollow interior region 14, a plurality of catalyst nanoparticles 22 within the hollow interior region 14, wherein the particles are at least partially fluidized by the introduction of a fluidizing material through a fluidizing input 24, and the catalyst nanoparticles and the contaminated gas react to produce a decontaminated gas, a port 26 for the exit of the decontaminated gas out of the hollow interior region 14, a second input 28 for introducing a backpressure pulse of gaseous material into the hollow interior region 14 through the port 26 and a gas permeable separation device 30 in communication with both the port 26 and the second input 28, wherein the exit of decontaminated gas causes catalyst nanoparticles to collect upon the gas permeable separation device 30 and the entrance of the backpressure pulse into the hollow interior region 14 displaces collected catalyst nanoparticles 22. The method further comprises introducing the contaminated gas into the hollow interior region 14, passing the decontaminated gas from the hollow interior region 14 through the port 26 and the gas permeable separation device 30 so that catalyst nanoparticles 22 collect on the gas permeable separation device 30, and introducing the backpressure pulse into the hollow interior region 14 through the port 26 and gas permeable separation device 30 so as to displace any catalyst nanoparticles 22 from the gas permeable separation device 30.

The reactor system 50 of the present disclosure proves a continuous flow, fluidized bed reactor that has the capacity to generate and maintain a dispersion of a catalyst particle cloud within the reactor for the effective break down of gaseous contaminants such as hydrocarbons and provide desirable throughputs and outputs. In one exemplary embodiment, which is meant to be illustrative as results may vary, the reactor system 50 provides a throughput having a flow rate of about 4 liters per minute. Thus, the present disclosure provides a catalytic reactor system 50 that produces high throughputs and outputs with minimized loss of particles.

EXAMPLES

A fluidized-bed reactor system according to FIG. 3 was constructed. The fluidized-bed chamber was constructed with two polycarbonate columns sized at 11⅜" H×2⅝" I.D. The upper column was modified by removing the bottom surface and by drilling a 1.0" hole through the aluminum screw cap at the top of the column. The bottom column was modified by installing a 2.0" dia.×¼" thick, course grade Pyrex glass frit, one inch from the bottom of the chamber. The columns were joined together with a 2" Proflex flexible coupling (Fernco Inc., Davison, Mich.). A UVP Blak-Ray, Long wave Ultraviolet Lamp, 17¾"×1.0", Model B100AP was installed through the aluminum screw cap and was freely extended through the upper column and 5½" through the lower column. An 18 gauge×2½" stainless steel needle was inserted at a 45° angle through the sidewall, two inches above the glass frit and served as an inlet. The needle was bent so that the airflow into the chamber would be centered and perpendicular to the glass frit surface. A ¼" NPT right angle, stainless steel tee was installed 1⅜" from the top of the chamber and served as an outlet. The fluidized bed chamber bottom was attached to a compact shaker (Fasco Industries, Inc., Eaton Rapids, Mich.). The shaker oscillations were controlled by a Powerstat (Superior Electric Co., Bristol, Conn.).

All tubing for the delivery of gases and air in and out of the fluidized-bed chamber was ¼" stainless steel or Teflon. Inlet air for the system was filtered building air that was regulated to a flow rate of 4 L/min. The air passed through a 500 mL glass bottle containing 50 mL water that served as a humidification chamber. Test chemicals were delivered into the system by a 0.5 mL glass, Teflon Luer-lock syringe. An 18 gauge×2½" stainless steel needle was attached to the lower end of the syringe and positioned in the center of a ¼" NPT right angle stainless steel tee. The delivery was controlled at a constant rate by an infusion pump (Model 975, Harvard Apparatus, Inc., Holliston, Mass.).

Gases and air passing out of the fluidized-bed chamber were filtered using 47-mm in-line stainless steel filter holders and 1.0 micron Teflon filters (Gelman Filtration, Ann Arbor, Mich.). The chamber system was monitored for hydrocarbons using a MicroFiD handheld flame ionization detector (FID) (Photovac Monitoring Instruments, Deer Park, N.Y.).

During operation of the fluidized-bed chamber, a thick dense cloud of $TiO_2$ was generated and completely occupied the chamber. In order to contain the $TiO_2$ within the fluidized-bed chamber, a 47-mm, 1.0-micron filer was placed near the system outlet. A pair of synchronously timed air pressure pulses were initiated through two solenoids (ASCO Automatic Switch Co., Florham Park, N.J.). Once every second, for 0.1 sec., the airflow to the inlet would be stopped and airflow across the outlet filter would clean the filter by forcing $TiO_2$ back into the chamber. Air pressure pulsing of $TiO_2$ caught on the outlet filter maintained the system pressure at less than 2 PSI. This sequence optimized the system to provide a clean outlet filter as well as proper airflow to the flame ionization detector.

A catalyst or metal co-catalyst sample was added to the bottom of the fluidized-bed chamber. The sample was either pure $TiO_2$, $TiO_2$ with a 15% by weight sample of Pt or Ag co-catalysts photochemically deposited on $TiO_2$, or $TiO_2$ with 15% by weight vanadium pentoxide ($V_2O_5$) sample added. The amount of starting material was 9 grams and the sample was pretreated by heating overnight at 110° C.

The catalyst used for the photocatalytic oxidation of styrene in the fluidized-bed reactor was P25 titanium dioxide fro Degussa Japan Co., Ltd. In order to synthesize a metal co-catalyst, metallic deposition of platinum or silver on titanium dioxide was achieved as follows. Platinum or silver metallic catalysts were prepared by a modified photodeposition technique. Pure-grade reagents were obtained from Merck (chloroplatinic acid hexahydrate, $H_2PtCl_6$ $6H_2O$, or silver nitrate, $AgNO_3$) or from Aldrich Chemical Co. Photodeposition of the metal onto the $TiO_2$ was carried out in a 200 mL Pyrex beaker equipped with a 0.25×6" quartz optical window located on top. UV light was provided by a UVP Blak-Ray, Long Wave Ultraviolet Lamp, Model B100AP placed directly on the quartz window. A slurry was made up of 18.5 g $TiO_2$ in 1000 mL water containing the 0.5 g/L of the desired metals. The slurry was added to the beaker and degassed for 15 min by delivery of $N_2$ bubbled through a gas dispersion tube while stirring. The slurry was then exposed to UV light for at least 8 hrs. The resulting metal/$TiO_2$ samples were filtered through a 0.45 µm cellulose nitrate membrane and washed with distilled water. The sample was allowed to dry overnight at 100° C. Analysis of the products was performed by dissolving small aliquots of the samples and measuring the metal contents by Inductively Coupled Plasma Atomic Emission Spectroscopy. Vanadium metal co-catalyst was also used to determine the fluidized-bed system effectiveness by simply mixing vanadium pentoxide ($V_2O_5$) with $TiO_2$.

The airflow was turned on and humidified to obtain a system flow rate of 4 L/min. Air pressure pulsing of the system was started immediately to keep the total system pressure below 2 PSI. Flow rate to the FID was set at 0.4 L/min. The infusion pump was set to deliver liquid styrene at a rate of 0.6 µL/min by using a 500 µL gas tight syringe, in to the system through the same port as the airflow that initiated the fluidization of the $TiO_2$ particles. The styrene was monitored by way of a FID and the infusion pump was adjusted until 60 or 90-ppm styrene was achieved and remained constant for several minutes. The UV light was then turned on and FID readings were taken every minute or every 5 minutes. All components of the fluidized-bed photoreactor system were operated at room temperature.

Degussa-P25 $TiO_2$ consisted of highly dispersed, nano-sized spherical titania particles with a specific surface area of 45 $m^2$/g and an average primary particle size of 21 nm. Inductively Coupled Plasma Atomic Emission Spectroscopy results showed that the photochemically deposited metal co-catalysts contained 1.88% Pt, or 1.14% Ag. Transition electron microscopy (TEM) micrograph examination of the deposited metals established that platinum or silver crystallites of between 3 and 8 nm in diameter were deposited on $TiO_2$ particles. Platinum deposited initially as small crystallites that were found to be well distributed on the titania particles. TEM examination also showed larger diameter silver crystallites deposited but these deposits were much less numerous.

Figure 4:
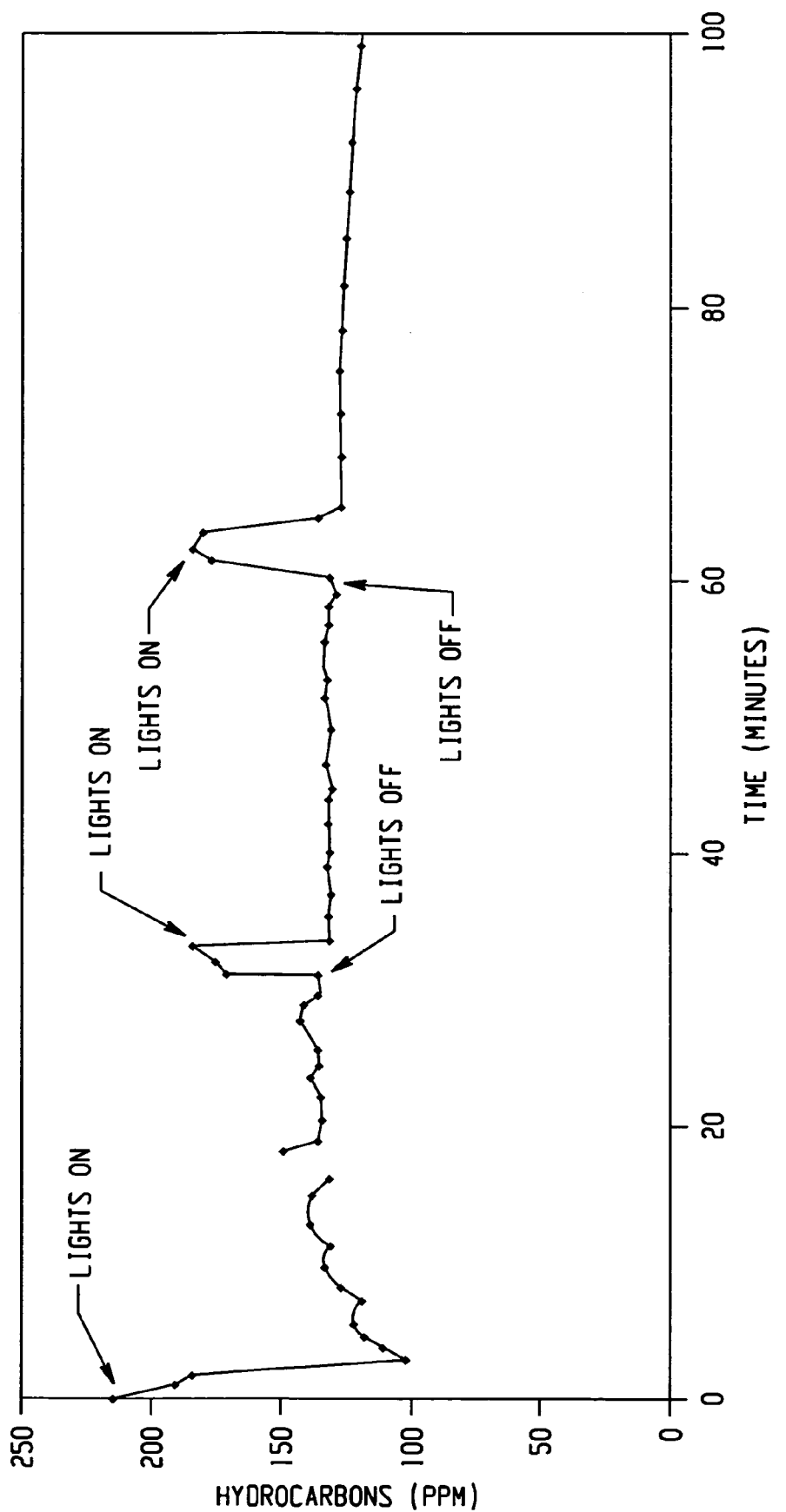
FIG. 4 is a graph illustrating a flame ionization detector response of styrene gas breakdown using Ag—$TiO_2$ catalyst nanoparticles by cycling UV light on and off.

A titanium dioxide cloud was generated inside the reactor and remained fluidized, stable, and contained for up to three hours. The effectiveness of the fluidized-bed photoreactor for breakdown of styrene gas using PCO was tested by creating a stable, fluidized cloud of $TiO_2$, introducing styrene gas into the system, and turning on the UV light. When the PCO process was initiated in the fluidized-bed photoreactor, 30-50% styrene gas was immediately broken down. Results of the fluidized-bed photoreactor response by cycling the UV light on and off are shown in FIG. 4.

Figure 5:
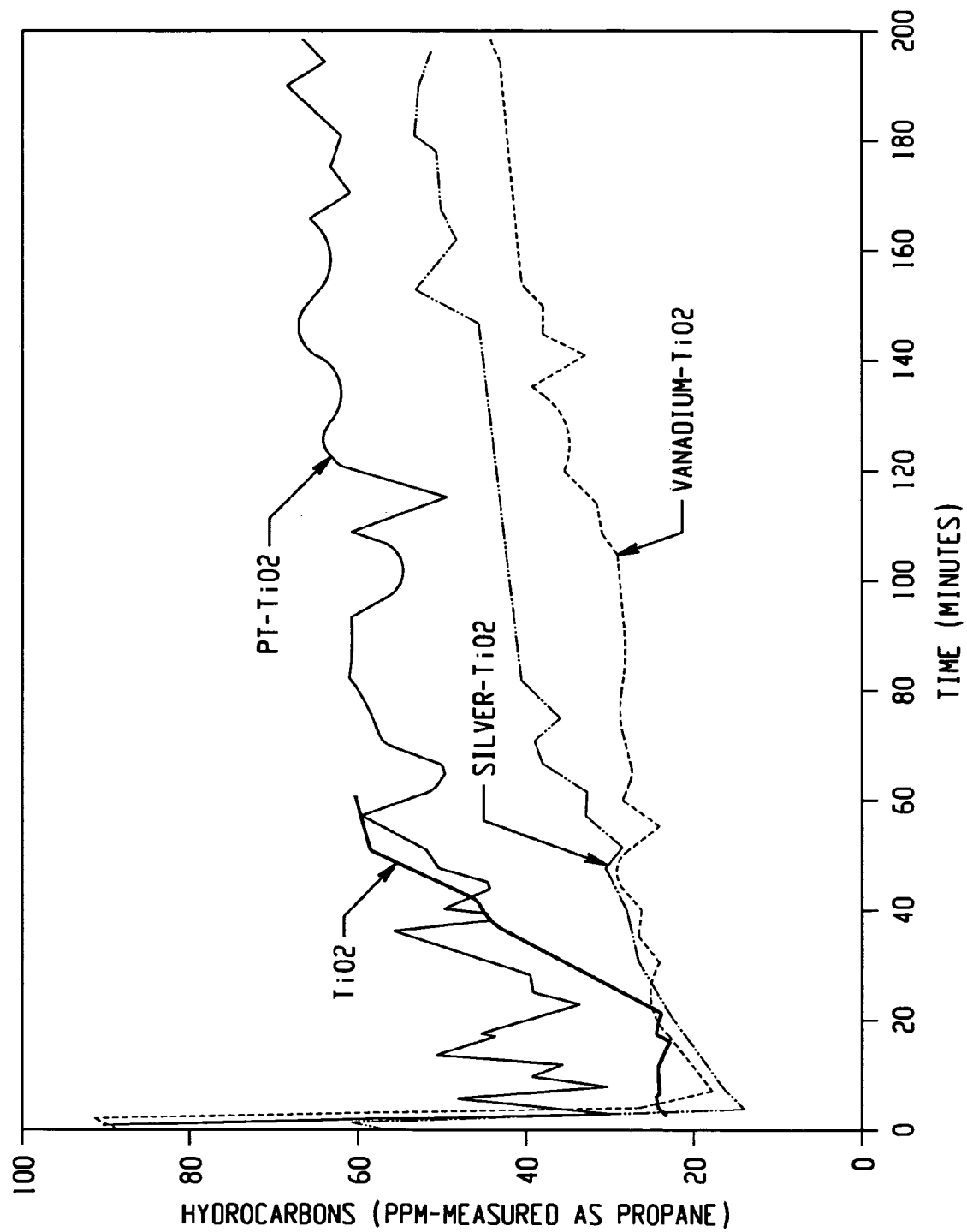
FIG. 5 is a graph illustrating a flame ionization detector response of styrene gas breakdown using various photocatalyst nanoparticles.

Using $TiO_2$, or a variety of metal co-catalysts, the effectiveness of the fluidized-bed photoreactor for breaking down styrene gas was determined. Four different types of $TiO_2$ catalysts were studied. First, titanium dioxide alone gave a quick, initial response at two minutes, which degraded over 60% of the initial 60 ppm styrene concentration. At the end of the 60-minute experiment, a falloff in the breakdown of styrene by way of the PCO process resulted in no further styrene degradation. Second, silver was photochemically deposited onto titanium dioxide and gave an initial response of 75% breakdown of 60 ppm styrene gas. The decline of the styrene breakdown was gradual over this 3-hour experiment, which finally resulted in 16% styrene breakdown. Third, platinum, also photochemically deposited onto titanium dioxide resulted in an initial breakdown of over 70% of 90 ppm styrene gas. At the end of three hours, only 27% of the styrene gas continued to be degraded due to a falloff in the PCO breakdown of styrene. Finally vanadium pentoxide was added to the titanium dioxide powder, mixed and used to assess the effectiveness of the photoreactor. Initially 80% of 90 ppm styrene gas was degraded. After three hours, a slow-down in the rate of reaction of the PCO process resulted in 50% styrene gas that continued to be broken down. In each experiment, consistent with the drop-off over time of the breakdown of styrene was also a color of the $TiO_2$ from white to tan. Varying the temperature from room temperature up to 90° C. did not improve the breakdown of styrene or affect the decline in the rate of reaction. FIG. 5 shows the graphs of the FID response over time of styrene breakdown using various catalysts.

Unless otherwise indicated, all numbers expressing quantities of ingredients, properties such as molecular weight, reaction conditions, and so forth used in the specification and claims are to be understood as being modified in all instances by the term "about". Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in specific examples are reported as precisely as possible. Any numerical value, however, inherently contain certain errors necessarily resulting from the standard deviation found in their respective testing measurements.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to a particular embodiment disclosed as the best mode contemplated for carrying out this invention, but that the invention will include all embodiments falling within the scope of the appended claims.

What is claimed is:

1. A fluidized-bed reactor system comprising:
   a chamber defining a hollow interior region and having a lower surface, the lower surface defining a portion of the hollow interior region;
   a first input for introducing a contaminated gas into the hollow interior region, the contaminated gas comprising at least one hydrocarbon contaminant;
   a plurality of catalyst nanoparticles within the hollow interior region and located on the lower surface, wherein the catalyst nanoparticles have an average particle diameter of about 15 nm to about 25 nm, and wherein the catalyst nanoparticles are capable of catalyzing the break down of a contaminated gas to produce a decontaminated gas comprising carbon dioxide;

a reaction product comprising carbon dioxide in the hollow interior region; and a fluidizing input, located downstream of the first input, for introducing a fluidizing material into the hollow interior region, said fluidizing input having an outlet directed towards the lower surface and between about 0° to 90° with respect to the lower surface of the chamber such that the fluidizing material fluidizes at least a portion of the plurality of catalyst nanoparticles located at the lower surface of the chamber to form a gaseous dispersion, and the catalyst nanoparticles being selected from the group consisting of copper, ruthenium, osmium, platinum, silver, nickel, rhodium, palladium, gold, titanium dioxide, aluminum oxide, vanadium pentoxide, iron (III) oxide, zinc oxide, cadmium sulfide, zinc telluride, zirconium oxide, molybdenum disulfide, tin oxide, antimony tetraoxide, cesium dioxide, tungsten trioxide, niobium pentoxide and combinations thereof.

2. The fluidized-bed reactor system of claim 1 wherein the catalyst nanoparticles are partially fluidized by the introduction of the contaminated gas through the first input.

3. The fluidized-bed reactor system of claim 1 further comprising a port for the exit of the decontaminated gas comprising carbon dioxide out of the hollow interior region.

4. The fluidized-bed reactor system of claim 3 further comprising a second input for introducing a backpressure pulse of gaseous material into the hollow interior region through the port.

5. The fluidized-bed reactor system of claim 4 further comprising a gas permeable separation device in communication with both the port and the second input, wherein the exit of decontaminated gas comprising carbon dioxide from the hollow interior region through the gas permeable separation device causes catalyst nanoparticles to collect upon the gas permeable separation device and the entrance of the backpressure pulse into the hollow interior region through the port displaces collected catalyst nanoparticles and allows said collected catalyst nanoparticles to flow through the port directly back into the hollow interior region to join the fluidized catalyst nanoparticles and continue catalyzing the break down of contaminated gas within the hollow interior region.

6. The fluidized-bed reactor system of claim 1, further comprising a humidifier in communication with the first input.

7. The fluidized-bed reactor system of claim 4 further comprising a device for synchronizing the function of the second input for introducing a backpressure pulse of gaseous material into the hollow interior region to function with at least one of the group comprising the first input for introducing a contaminated gas into the hollow interior region, the fluidizing input for introducing a fluidizing material into the hollow interior region and combinations thereof, wherein the device for synchronizing prevents the simultaneous introduction of at least one of the group comprising contaminated gas, fluidizing material, and combinations thereof with a backpressure pulse of gaseous material into the hollow interior region.

8. The fluidized-bed reactor system of claim 1 further comprising an ultraviolet light.

9. The fluidized-bed reactor system of claim 8, wherein the ultraviolet light is positioned within the hollow interior region of the chamber.

10. The fluidized-bed reactor system of claim 8, wherein the ultraviolet light is positioned outside the chamber.

11. The fluidized-bed reactor system of claim 8, further comprising a humidifier in communication with the first input.

12. The fluidized-bed reactor system of claim 1, further comprising a means for agitating the catalyst nanoparticles within the hollow interior region.

13. The fluidized-bed reactor system of claim 12, wherein the means for agitating comprises a shaker device.

14. The fluidized-bed reactor system of claim 12 wherein the means for agitating comprises a vibrator.

15. A method of removing contaminants from a contaminated gas comprising:

providing a fluidized-bed reactor comprising:
a chamber defining a hollow interior region and having a lower surface, the lower surface defining a portion of the hollow interior region;
a first input for introducing a contaminated gas into the hollow interior region, the contaminated gas comprising at least one hydrocarbon contaminant;
a plurality of catalyst nanoparticles within the hollow interior region and located on the lower surface, wherein the catalyst nanoparticles have an average particle diameter of about 15 nm to about 25 nm;
a fluidizing input, located downstream of the first input, for introducing a fluidizing material into the hollow interior region, said fluidizing input having an outlet directed towards the lower surface and between about 0° to 90° with respect to the lower surface of the chamber to form a gaseous dispersion,
wherein the introduction of the fluidizing material directed at the lower surface fluidizes at least a portion of the catalyst nanoparticles located on the lower surface to create a gaseous dispersion of catalyst nanoparticles that catalyzes the break down of the contaminated gas to produce a decontaminated gas comprising carbon dioxide;
a port for the exit of the decontaminated gas comprising carbon dioxide out of the hollow interior region;
a second input for introducing a backpressure pulse of gaseous material into the hollow interior region through the port; and
a gas permeable separation device in communication with both the port and the second input;
introducing the contaminated gas into the hollow interior region;
introducing the fluidizing material into the chamber and directing the fluidizing material at the lower surface to fluidize at least a portion of the catalyst nanoparticles located on the surface to create a gaseous dispersion of catalyst nanoparticles that catalyze the break down of the contaminated gas to produce a decontaminated gas comprising carbon dioxide;
reacting the contaminated gas to produce a decontaminated gas comprising carbon dioxide;
passing the decontaminated gas comprising carbon dioxide from the hollow interior region through the port and the separation device so that catalyst nanoparticles are collected on the separation device; and
introducing a backpressure pulse into the hollow interior region through the port and separation device so as to displace catalyst nanoparticles from the separation device; and
allowing the plurality of catalyst nanoparticles displaced from the gas separation device to directly join the fluidized dispersion of catalyst nanoparticles and continue catalyzing the break down of the contaminated gas within the hollow interior region, the catalyst nanoparticles being selected from the group consisting of copper, ruthenium, osmium, platinum, silver, nickel, rhodium, palladium, gold, titanium dioxide, aluminum oxide, vanadium pentoxide, iron (III) oxide, zinc oxide, cadmium sulfide, zinc telluride, zirconium oxide, molybdenum disulfide, tin oxide, antimony tetraoxide, cesium dioxide, tungsten trioxide, niobium pentoxide and combinations thereof.

16. The method of claim 15, further comprising the step of synchronizing the function of the second input for introducing a backpressure pulse of gaseous material into the hollow interior region to function with at least one of a group comprising the first input for introducing a contaminated gas into the hollow interior region, the fluidizing input for introducing a fluidizing material into the hollow interior region and combinations thereof, wherein the device for synchronizing prevents the simultaneous introduction of at least one of the group comprising contaminated gas, fluidizing material, and combinations thereof with a backpressure pulse of gaseous material into the hollow interior region.

17. A fluidized bed reactor system comprising:
a fluidized-bed reactor having a chamber, a plurality of catalyst nanoparticles capable of catalyzing the break down of a contaminated gas to produce a decontaminated gas comprising carbon dioxide, a first input, a fluidizing input located downstream of the first input, a port, a second input and a gas permeable separation device, the chamber defining a hollow interior region with the plurality of catalyst nanoparticles disposed therein and a lower surface defining a portion of the hollow interior region, each of the plurality of catalyst nanoparticles having an average diameter within a range between about 15 and about 25 nanometers, and the first input, the fluidizing input, and the port being in communication with the hollow interior region, the first input configured to direct a contaminated gas into the hollow interior region, the contaminated gas comprising at least one hydrocarbon contaminant, the fluidizing input configured to direct a fluidizing material toward the lower surface and between about 0° to 90° with respect to the lower surface and the plurality of catalyst nanoparticles for fluidizing at least a portion of the plurality of catalyst nanoparticles and creating a gaseous dispersion of catalyst nanoparticles that catalyzes the break down of the contaminated gas to produce a decontaminated gas comprising carbon dioxide, the gas permeable separation device being in communication between the port and the second input, the port configured to direct the decontaminated gas from the hollow interior region through the gas permeable separation device such that the plurality of catalyst nanoparticles collect on the gas permeable separation device, the second input configured to direct a backpressure pulse of gaseous material into the hollow interior region through the gas permeable separation device for displacing the plurality of catalyst nanoparticles previously collected on the gas permeable separation device therefrom, and allowing the plurality of catalyst nanoparticles displaced from the gas separation device to directly join the fluidized dispersion of catalyst nanoparticles and continue catalyzing the break down of the contaminated gas within the hollow interior region, a reaction product comprising carbon dioxide in the hollow interior region, the catalyst nanoparticles being selected from the group consisting of copper, ruthenium, osmium, platinum silver, nickel, rhodium, palladium, gold, titanium dioxide, aluminum oxide, vanadium pentoxide, iron (III) oxide, zinc oxide, cadmium sulfide, zinc telluride, zirconium oxide, molybdenum disulfide, tin oxide, antimony tetraoxide, cesium dioxide, tungsten trioxide, niobium pentoxide and combinations thereof and
at least one control device coupled to the second input and at least one of the first and fluidizing inputs, the at least one control device configured to alternate the backpressure pulse of gaseous material through the gas permeable separation device with an entrance of at least one of the contaminated gas and the fluidizing material into the hollow interior region.

18. The fluidized bed reactor system of claim 17, wherein the at least one control device is further configured to introduce the backpressure pulse of gaseous material through the gas permeable separation device for about 0.2 seconds and introduce at least one of the contaminated gas and the fluidizing material into the hollow interior region for about 0.8 seconds.

19. The fluidized bed reactor system of claim 17, wherein the at least one control device comprises at least one of a needle valve, a solenoid, a computer, a generator and a sensor.

20. The fluidized bed reactor system of claim 17, wherein the at least one control device is configured to introduce the backpressure pulse of gaseous material at a force based on at least one of a volume of the hollow interior region, a density of the contaminated gas, a concentration of the contaminated gas, a composition of the contaminated gas, a composition of the plurality of catalyst nanoparticles, an internal pressure of a contaminated gas source, a temperature of a contaminated gas source and a particle build up in the chamber of the fluidized-bed reactor.

21. The fluidized bed reactor system of claim 17, further comprising a gas permeable layer within the hollow interior region of the chamber, the gas permeable layer having the plurality of catalyst nanoparticles thereon in a non-fluidized state, and the fluidizing input being disposed 45 degrees relative to the gas permeable layer and having an outlet directed at the plurality of catalyst nanoparticles on the gas permeable layer.

22. The fluidized bed reactor system of claim 17, wherein the second input has a decontaminated gas passage way, the decontaminated gas passage way configured to receive the decontaminated gas exiting from the hollow interior region through the port and the gas permeable separation device, the decontaminated gas passage way further configured to recycle the decontaminated gas through at least one of the fluidizing inlet and the port into the hollow interior region.

23. The fluidized bed reactor system of claim 22, further comprising a flame ionization detector in communication between the decontaminated gas passage way and the fluidizing input, such that the decontaminated gas passes through the flame ionization detector to the fluidizing input.

24. The fluidized bed reactor system of claim 22, wherein the at least one control device includes a filtration device and a gauge, the filtration device in communication with a decontaminated gas passage way, the filtration device configured to collect the plurality of catalyst nanoparticles that bypasses the gas permeable separation device from the hollow interior region, and the gauge configured to generate a signal indicative of a quantity of catalyst nanoparticles that bypasses the gas permeable separation device, the signal being received by another control device.

25. The fluidized bed reactor system of claim 24, wherein the gauge is further configured to determine a pressure within the fluidized bed reactor system.

26. The fluidized bed reactor system of claim 17, further comprising a gas source coupled to at least one of the second and fluidizing inputs for providing the backpressure pulse of gaseous material and an entrance of the fluidizing material into the hollow interior region, respectively.

27. The fluidized-bed reactor system of claim 1 further comprising water vapor as a reactant in the hollow interior region.

28. The method of claim 15 further comprising introducing water vapor as a reactant into the hollow interior region through the first input.

29. The fluidized bed reactor system of claim 17 further comprising water vapor as a reactant in the hollow interior region.

* * * * *